(12) United States Patent
Wada et al.

(10) Patent No.: US 8,251,644 B2
(45) Date of Patent: Aug. 28, 2012

(54) ENGINE BLOWER

(75) Inventors: Shinichi Wada, Kawagoe (JP); Ryou Ono, Kawagoe (JP); Ryouji Zama, Kawagoe (JP)

(73) Assignee: Husqvarna Zenoah Co., Ltd., Kawagoe-Shi (JP)

( * ) Notice: Subject to any disclaimer, the term of this patent is extended or adjusted under 35 U.S.C. 154(b) by 723 days.

(21) Appl. No.: 12/375,194

(22) PCT Filed: Jul. 24, 2007

(86) PCT No.: PCT/JP2007/064481
§ 371 (c)(1),
(2), (4) Date: Jan. 26, 2009

(87) PCT Pub. No.: WO2008/013158
PCT Pub. Date: Jan. 31, 2008

(65) Prior Publication Data
US 2010/0008762 A1 Jan. 14, 2010

(30) Foreign Application Priority Data
Jul. 26, 2006 (JP) .................. 2006-203103

(51) Int. Cl.
F04D 29/66 (2006.01)
(52) U.S. Cl. .............. 415/119; 415/204; 415/213.1; 417/234; 417/360
(58) Field of Classification Search .......... 417/234, 417/360, 363, 364; 415/119, 204, 206, 213.1, 415/214.1
See application file for complete search history.

(56) References Cited

U.S. PATENT DOCUMENTS 4,079,882 A * 3/1978 Mizuyoshi et al. ............ 494/60
6,619,409 B2 * 9/2003 Iida ........................... 173/162.2
2002/0174511 A1 11/2002 Iida et al.

FOREIGN PATENT DOCUMENTS

| JP | 57-127689 U | 8/1982 |
|---|---|---|
| JP | 2001-153099 A | 6/2001 |
| JP | 2001-241019 A | 9/2001 |

(Continued)

OTHER PUBLICATIONS

English Language International Search Report dated September 4, 2007 issued in parent Appln. No. PCT/JP2007/064481.

(Continued)

*Primary Examiner* — Matthew W Such
*Assistant Examiner* — Krista Soderholm
(74) *Attorney, Agent, or Firm* — Holtz, Holtz, Goodman & Chick, PC

(57) ABSTRACT

An engine blower includes a centrifugal blower, an engine, and a frame for supporting the centrifugal blower. The centrifugal blower is supported by a back support of the frame via a flexible vibration-proofing section while being connected to the back support via a belt-shaped stopper. An engaging hole is provided on at least one of the centrifugal blower and the back support, and a thick engaging section is provided on at least one end of the stopper for being engaged with the engaging hole. When the stopper is inserted into the engaging hole and the one end of the stopper is pulled, the engaging section is engaged with the engaging hole. By further pulling the one end of the stopper, the engaging section is tightly buried into the engaging hole. Thus, the stopper can be reliably attached to the centrifugal blower or the back support.

2 Claims, 8 Drawing Sheets

FOREIGN PATENT DOCUMENTS

JP    2002-348824 A    12/2002

OTHER PUBLICATIONS

English language International Preliminary Report on Patentability and Written Opinion of the International Searching Authority (5 pages), dated Feb. 5, 2009, issued in counterpart International Application No. PCT/JP2007/064481.

Japanese Office Action dated Feb. 7, 2012 (and English translation thereof) in counterpart Japanese Application No. 2006-203103.

* cited by examiner

ENGINE BLOWER

This application is a U.S. National Phase Application under 35 USC 371 of International Application PCT/JP2007/064481 filed Jul. 24, 2007.

TECHNICAL FIELD

The present invention relates to an engine blower, and particularly to an engine blower having a centrifugal blower and a frame which are prevented from being separated from each other.

BACKGROUND ART

In a conventional back-pack engine blower, a centrifugal blower in which a fan is accommodated is supported by a synthetic-resin frame that has a horizontal base and a vertical back support so as to provide an L-shape as viewed from a lateral side. Specifically, two places on the lower side of the centrifugal blower are supported on the base via a rubber mount, and one place on the upper side of the centrifugal blower is supported on the back support via another rubber mount. Vibration transmitted from the centrifugal blower to the frame is reduced by connecting the centrifugal blower to the frame via such rubber mounts having elasticity (for example, see Patent Document 1).
[Patent Document 1] JP-A-2001-241019

DISCLOSURE OF THE INVENTION

Problems to Be Solved by the Invention

However, in a supporting structure of the centrifugal blower as disclosed in Patent Document 1, the rubber mount of the back support is subjected to an excessive load when an unexpected strong impact is imposed on the centrifugal blower toward a side opposed to the back support (hereinafter simply referred to a rear side). Thus, the supporting structure of the centrifugal blower needs to be considerably strengthened in order to prevent the centrifugal blower from being separated from the frame due to such load, which results in an increase in manufacturing cost.

In order to solve such problem, for example, the centrifugal blower may be connected to the frame via a flexible belt-like stopper. Even when the centrifugal blower goes toward the rear side due to an unexpected impact or the like, the centrifugal blower does not excessively go rearward beyond a predetermined amount. Thus, the supporting portion of the back support can be prevented from being subjected to an excessive load.

At this time, there may be various methods to attach an end of the stopper to the frame or the centrifugal blower. For example, when the end of the stopper is attached to the back support or a volute case by welding, cost is increased since a machine dedicated for welding is needed and the welding itself is effort-consuming. Alternatively, when the stopper is bored to be attached to the frame or the volute case by using a resin clip or a screw, the strength of the stopper is reduced due to the hole on the stopper.

An object of the present invention is to provide an engine blower having a stopper capable of being attached to a frame without increasing manufacturing cost and without reducing strength of the stopper.

Means for Solving the Problems

An engine blower according to an aspect of the invention includes: a centrifugal blower including a volute case in which a fan is accommodated; an engine attached to the centrifugal blower for driving the fan; and a frame for supporting the centrifugal blower, in which the centrifugal blower is supported by a back support of the frame through a flexible vibration-proofing section while being connected to the back support via a belt-shaped stopper, an engaging hole is provided on at least one of the centrifugal blower and the back support, and a thick engaging section to be engaged with the engaging hole is provided on at least one end of the stopper.

According to the aspect of the invention, the engaging hole is provided on at least one of the centrifugal blower and the back support, and the thick engaging section is provided on at least one end of the stopper for being engaged with the engaging hole. Accordingly, when the stopper is inserted into the engaging hole so that the engaging section is engaged with the engaging hole, the engaging section can be tightly buried into the engaging hole by further strongly pulling the stopper. Thus, the stopper can be reliably attached to the centrifugal blower or the back support. Since the stopper can be attached to the centrifugal blower or the back support only by engaging the engaging section with the engaging hole, a machine dedicated for mounting is not required. Consequently, the manufacturing cost can be reduced. At the same time, dedicated attachment parts such as a resin clip are not required, so that the number of parts can be reduced. Further, since the stopper can be attached to the centrifugal blower without boring, the strength of the stopper can be maintained.

In the engine blower according to the aspect of the invention, the stopper may be provided by one consecutive belt member having both ends being folded inwardly to form folded-back sections, and the engaging section may be provided by seaming the folded-back sections.

According to the aspect of the invention, the stopper has the folded-back sections formed by folding both ends of the one belt member inwardly, and the engaging section is provided by seaming the folded-back sections. Accordingly, the both ends of the belt member are disposed on an inner side of the engaging section. In a case where the both ends defining the folded-back sections are disposed on an outer side of the stopper, the both ends may be turned outward due to friction with an inner surface of the engaging hole when the stopper is pulled. Consequently, the seam of the ends may be unfavorably split off. However, since the both ends are disposed on the inner side of the engaging section according to the aspect of the invention, the seam of the ends can be prevented from being subjected to pressure. Thus, the structure of the stopper can be strengthened.

BEST MODE FOR CARRYING OUT THE INVENTION

First Exemplary Embodiment

A first exemplary embodiment of the invention will be described below with reference to the accompanying drawings.

Figure 1:
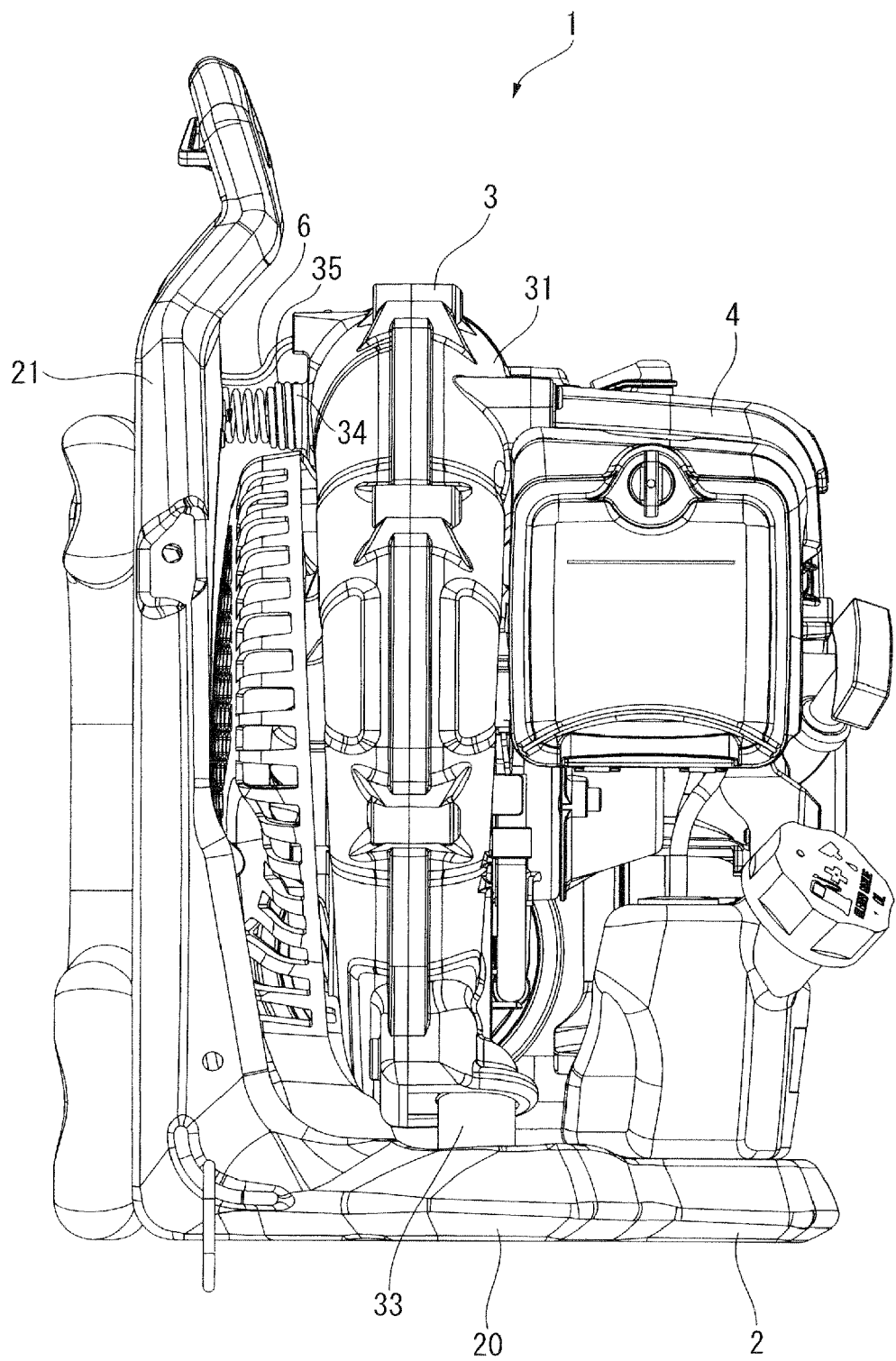
FIG. 1 is a side view showing an engine blower according to a first exemplary embodiment of the invention.
Figure 2:
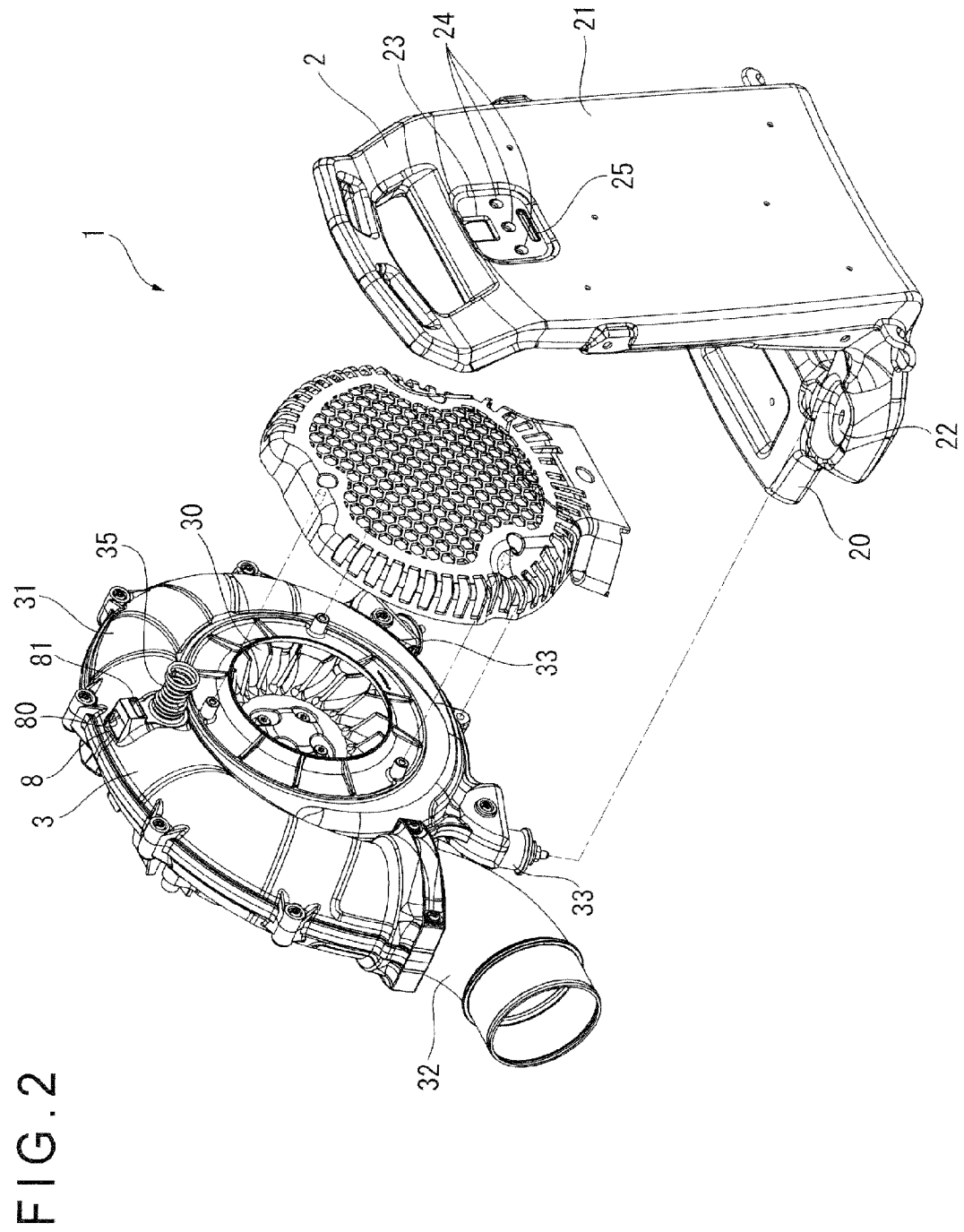
FIG. 2 is an exploded perspective view of the engine blower.
Figure 3:
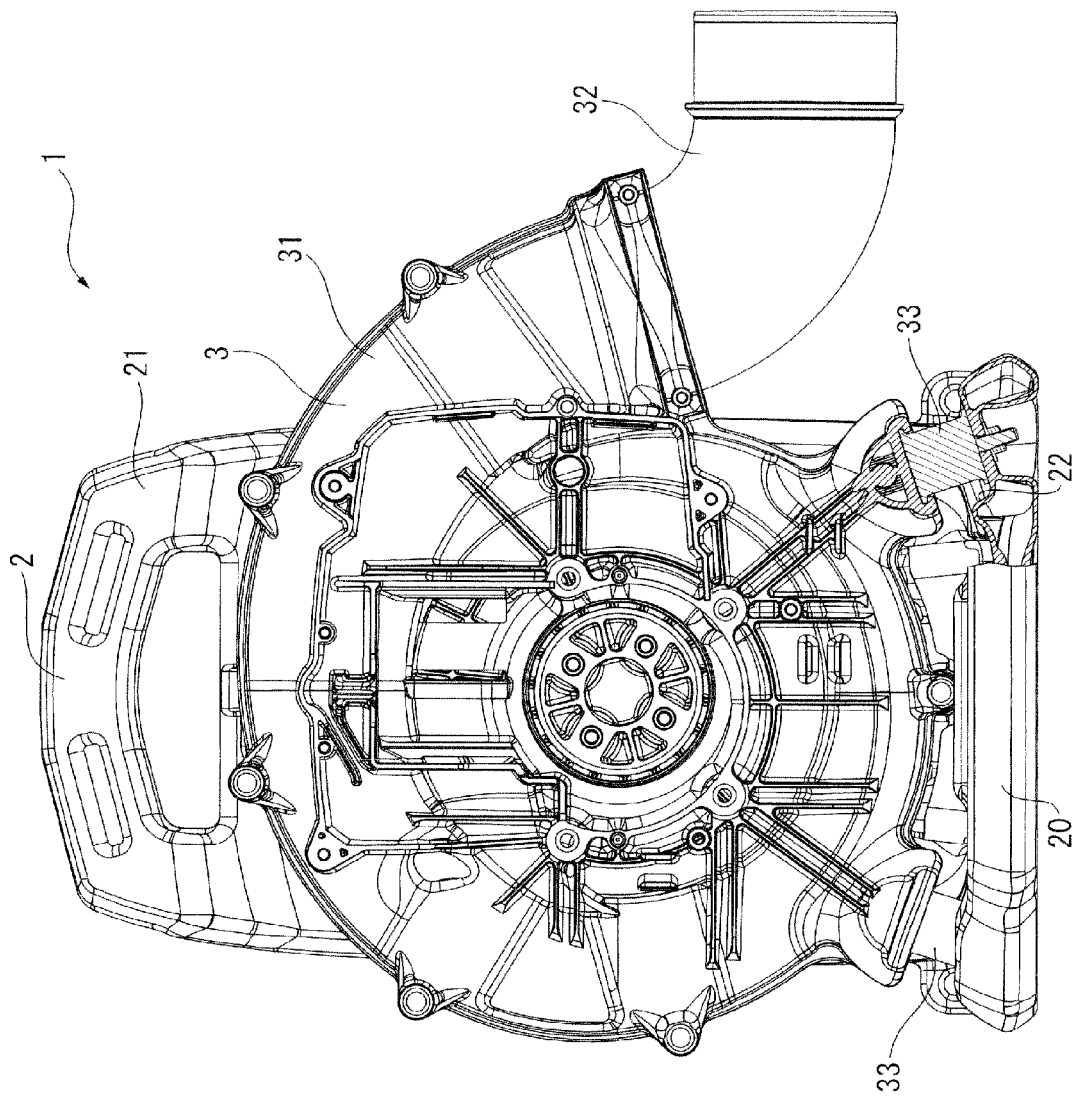
FIG. 3 is a front view of the engine blower.

FIG. 1 is a side view of an engine blower 1 according to the exemplary embodiment. FIG. 2 is an exploded perspective view of the engine blower 1 and FIG. 3 is a front view of the engine blower 1.

As shown in FIG. 1 and FIG. 2, the engine blower 1, which is a back-pack type, includes: an L-shaped synthetic-resin frame 2 having a horizontal base 20 and a vertical back support 21; a centrifugal blower 3 having a volute case 31 in which a centrifugal fan 30 is accommodated, the centrifugal blower 3 being supported on the frame 2; an engine 4 mounted to the volute case 31 for rotating the fan 30; and a ventilation tube (not shown) mounted to an elbow 32 of the centrifugal blower 3 for ejecting jet-air caused by the rotation of the fan 30.

A pair of right and left attachment holes 22 (only one of which is shown in FIG. 2) are provided on the base 20 of the frame 2. The centrifugal blower 3 is supported by the base 20 via rubber mounts 33 fitted to the attachment holes 22. As shown in FIG. 3, the rubber mounts 33 are formed in a reverse truncated V-shape as viewed from the front side. In other words, the rubber mounts 33 are disposed in a radial direction relative to the centroid of the centrifugal blower 3, so that the centrifugal blower 3 can be firmly and stably supported.

Figure 4:
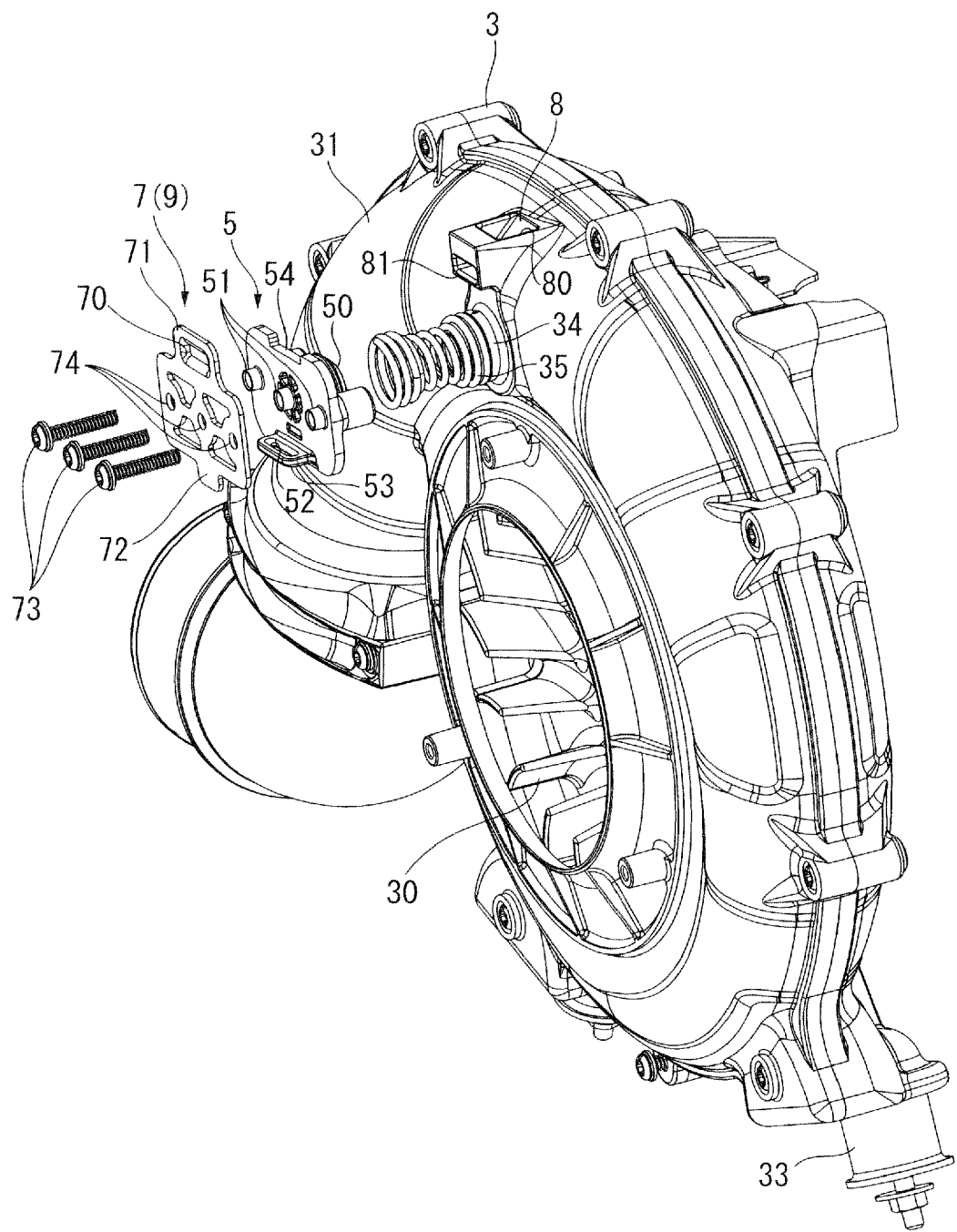
FIG. 4 is an exploded perspective view showing a holder and a plate for allowing a centrifugal blower to be supported by a back support.

FIG. 4 is an exploded perspective view showing a holder 5 and a plate 7 for allowing the centrifugal blower 3 to be supported by the back support 21 (see FIGS. 1 and 2). Incidentally, in FIG. 4, the frame 2 is not shown, in order to clearly show a positional relationship of the holder 5 and the plate 7.

An engaging hole 8 having a wide insert opening 80 and a narrow lead-out opening 81 is formed on an upper portion of the centrifugal blower 3. The insert opening 80 of the engaging hole 8 is opened upwardly and the lead-out opening 81 is opened toward the back support 21 of the frame 2.

A spring attachment 34 is formed immediately under the engaging hole 8 of the centrifugal blower 3. The spring attachment 34 is provided with a coil spring 35 (vibration-proofing section) that contacts the frame 2 (the later-described holder 5). The spring attachment 34 is engraved with an external screw. The coil spring 35 is screwed with the external screw to be attached to the spring attachment 34. As described above, the centrifugal blower 3 is supported by the frame 2 via the rubber mounts 33 on the lower side and the coil spring 35 on the upper side in this exemplary embodiment. Thus, vibration transmitted from the centrifugal blower 3 to the frame 2 is reduced.

As shown in FIG. 2, a stopper hole 23, a through hole 24, and a horizontally elongated holder hole 25 are formed on the back support 21 of the frame 2. Also, an operating arm (not shown) for operating a throttle of the engine 4 is provided on the side of the frame 2.

As shown in FIG. 4, the metal holder 5 abutted on the coil spring 35 is provided on a surface adjacent to the centrifugal blower 3 (a surface on the rear side) of the back support 21 of the frame 2. The holder 5 includes a groove-shaped guide section 54 provided on the upper end thereof, a convex spring guide section 50 into which the coil spring 35 is fitted, a plurality of screw holes 51 engraved with internal screws, and a holder-side engaging section 53 projecting forwardly (toward the left side in FIG. 1) from the lower end thereof. The guide section 54 guides a later-described stopper 6. The holder-side engaging section 53 penetrates the back support 21 and includes a slit 52 vertically penetrating the holder-side engaging section 53.

As shown in FIG. 4, the metal plate 7 is provided on a surface on the front side (the left side in FIG. 1) of the back support 21 to be opposed to the holder 5 interposing the back support 21 therebetween. The plate 7 includes a slit protrusion 71 that is provided with a slit 70 and protrudes upwardly from the upper side thereof, a plate-side engaging section 72 protruding downwardly from the lower side thereof, and a through hole 74 into which a screw 73 is inserted.

After the holder-side engaging section 53 of the holder 5 is inserted into a holder hole 25 of the back support 21, the plate-side engaging section 72 is inserted from the upper side into a slit 52 of the holder-side engaging section 53, so that the plate 7 is positioned. Then, the screw 73 is inserted into the through hole 74 and screwed into the screw hole 51 of the holder 5, so that the plate 7 is attached to the surface on the front side of the back support 21. As described above, the holder-side engaging section 53 is inserted into the holder hole 25 of the back support 21, and the plate-side engaging section 72 of the plate 7 is inserted into the slit 52. Subsequently, the screw 73 is screwed into the screw hole 51 so that the holder 5 is attached to the surface on the rear side of the back support 21.

Since the holder 5 is provided with the holder-side engaging section 53 having the slit 52 while the plate 7 is provided with the protruding plate-side engaging section 72 inserted into the slit 52, the plate 7 can be easily positioned by inserting the plate-side engaging section 72 into the slit 52 of the holder 5 from the upper side, which improves assembly efficiency.

In the exemplary embodiment as described above, the centrifugal blower 3 and the frame 2 are connected with each other via a flexible and belt-shaped stopper 6 as shown in FIG. 1.

Figure 5:
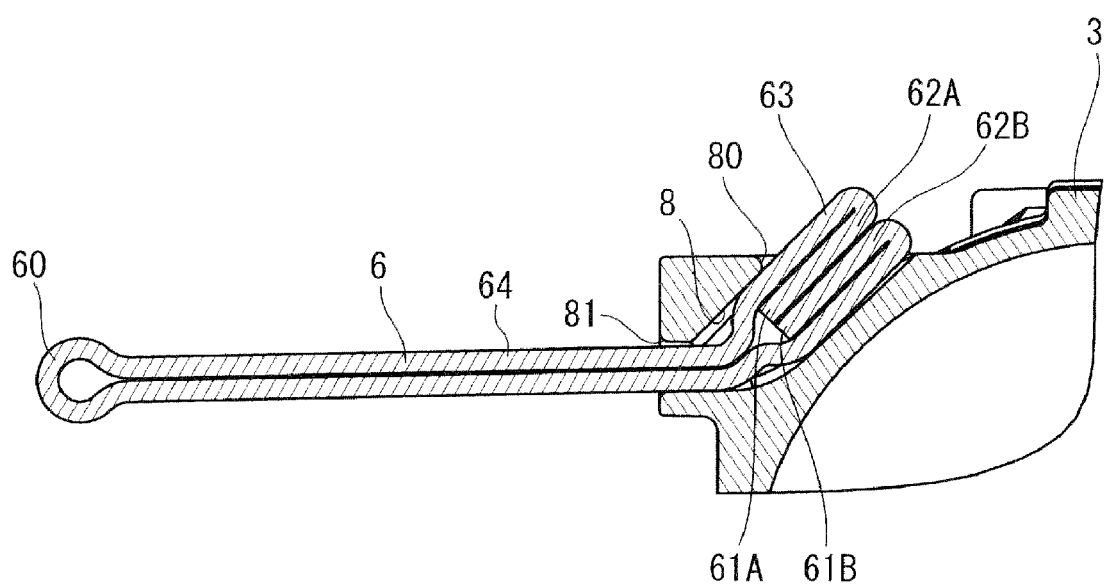
FIG. 5 is a cross sectional view of an engaging state of a stopper.

FIG. 5 is a cross sectional view of an engaging state of the stopper 6.

As shown in FIG. 5, a thick engaging section 63 is provided on one end of the stopper 6 by seaming a pair of folded-back sections 62A and 62B as described later in detail while a folded-back section 60 is provided on the other end of the stopper 6. The engaging section 63 is engaged with the engaging hole 8 provided on the centrifugal blower 3. Specifically, the stopper 6 is inserted into the insert opening 80 of the engaging hole 8 of the centrifugal blower 3 from the folded-back section 60 and led out from the lead-out opening 81, so that the engaging section 63 is engaged with the engaging hole 8.

In the exemplary embodiment, the engaging hole 8 is large at a side adjacent to the insert opening 80 and small at a side adjacent to the lead-out opening 81. Also, the thick engaging section 63 is provided on one end of the stopper 6. Thus, when the engaging section 63 is engaged with the engaging hole 8, the engaging section 63 can be tightly buried into the engaging hole 8 by strongly pulling the stopper 6 (wedge effect) so that the stopper 6 can be reliably attached to the centrifugal blower 3. Since the stopper 6 can be attached to the centrifugal blower 3 only by engaging the engaging section 63 with the engaging hole 8, a machine dedicated for attaching is not required, which reduces the manufacturing cost. Further, dedicated attachment parts such as a resin clip are not required, which reduces the number of parts. Furthermore, since the stopper 6 is mounted to the centrifugal blower 3 without boring, the strength of the stopper 6 can be maintained.

Figure 6:
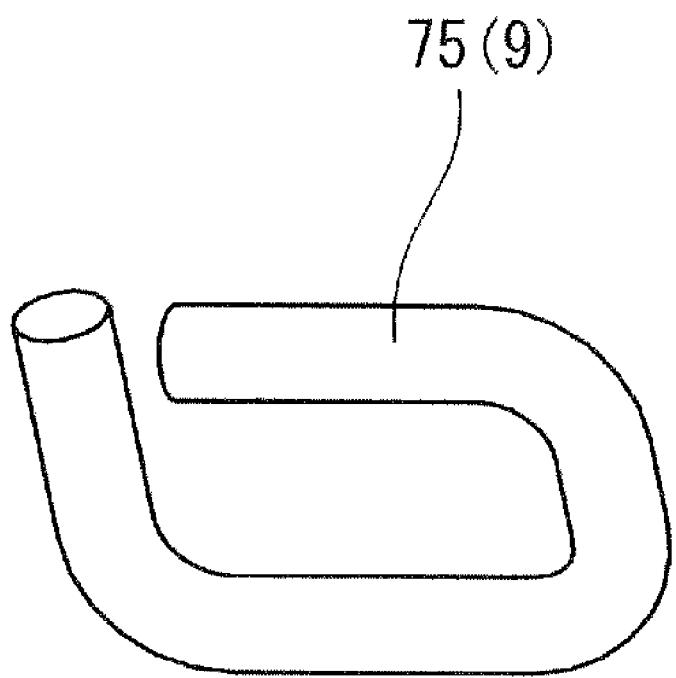
FIG. 6 is a perspective view of an attachment pin.

FIG. 6 is a perspective view of an attachment pin 75.

The folded-back section 60 of the stopper 6 is led through the engaging hole 8, the guide section 54 of the plate 7, a stopper hole 23 of the back support 21, and the slit 70 of the plate 7. Then, the attachment pin 75 as shown in FIG. 6 is attached to the folded-back section 60 inserted through the slit 70. The attachment pin 75 is engaged with the plate 7 to prevent the folded-back section 60 from dropping out of the back support 21 when the centrifugal blower 3 goes toward the rear side. The other side of the stopper 6 is mounted to the back support 21 as described above. In this exemplary embodiment, the attachment pin 75 and the plate 7 with which the attachment pin 75 is engaged define an attachment 9 for attaching the other side (the folded-back section 60) of the stopper 6 to the frame 2.

Incidentally, slack of the stopper 6 (see FIG. 1) is adjusted to prevent the centrifugal blower 3, at which weight is increased as a result of being attached with the engine 4, from going toward the rear side (the right side in FIG. 1) beyond a predetermined amount due to an unexpected sudden impact or the like. In other words, when the centrifugal blower 3 excessively goes rearward beyond the predetermined amount, the stopper 6 becomes taut before the coil spring 35 is tripped from the spring guide section 50 so that the centrifugal blower 3 does not go further rearward. Thus, even when the centrifugal blower 3 goes rearward due to a strong impact, the coil spring 35 is not excessively extended because the coil spring 35 is not subjected to a load in a tensile direction. Further, the coil spring 35 can be reliably prevented from dropping out of the frame 2, and the centrifugal blower 3 can be also reliably prevented from being separated from the frame 2.

A manufacturing method of the stopper 6 will be described below.

Figure 7:
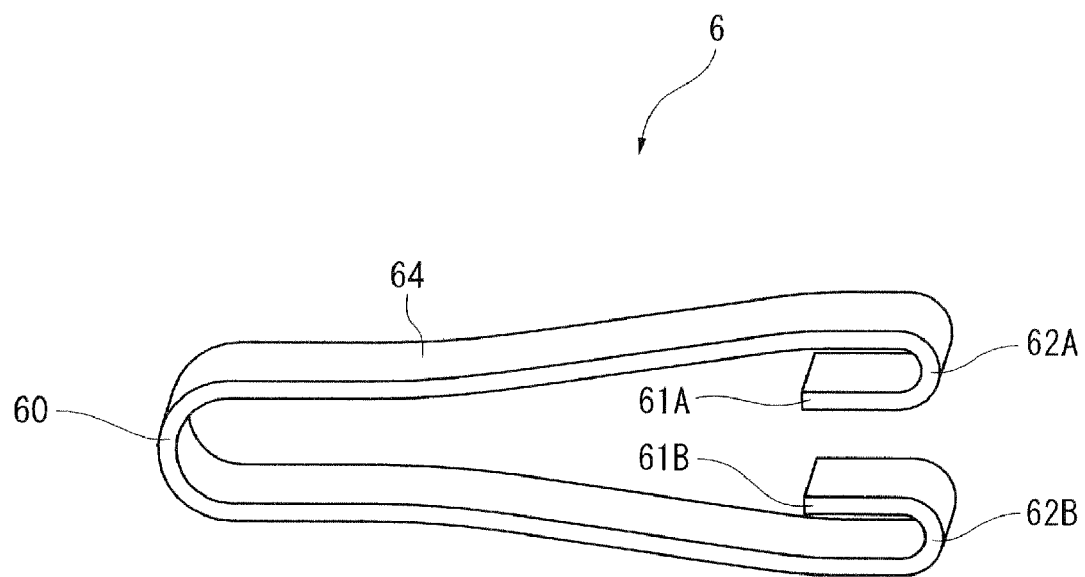
FIG. 7 is an illustration for explaining a manufacturing method of the stopper.

FIG. 7 is an illustration to explain the manufacturing method of the stopper 6.

As shown in FIG. 7, a belt member 64 braided by a chemical fiber, a natural fiber or the like is folded back at the center thereof to provide the folded-back section 60 on one end thereof. Subsequently, ends 61A and 61B of the belt member 64 are mutually folded inwardly to provide folded-back sections 62A and 62B. Then, the pair of folded-back sections 62A and 62B are seamed to provide the thick engaging section 63 (see FIG. 5) on the other end. Thus, the stopper 6 is formed.

In this exemplary embodiment, the engaging section 63 is tightly buried into the engaging hole 8 by pulling the stopper 6 to be attached to the centrifugal blower 3 as described above. Accordingly, when the ends 61A and 61B defining the folded-back sections 62A and 62B of the engaging section 63 are disposed on an outer side of the stopper 6, the ends 61A and 61B may be turned outward due to friction with an inner surface of the engaging hole 8 at the time of pulling the stopper 6. Consequently, the seam of the ends 61A and 61B may be unfavorably split off. However, in this exemplary embodiment, the ends 61A and 61B are disposed on an inner side of the engaging section 63. Thus, the seam of the ends 61A and 61B can be prevented from being subjected to pressure, and the structure of the stopper 6 can be strengthened to be sufficiently resistant to pressure toward the engaging section 63 by an impact or the like.

Second Exemplary Embodiment

A second exemplary embodiment of the invention will be described below with reference to the accompanying drawings.

Figure 8:
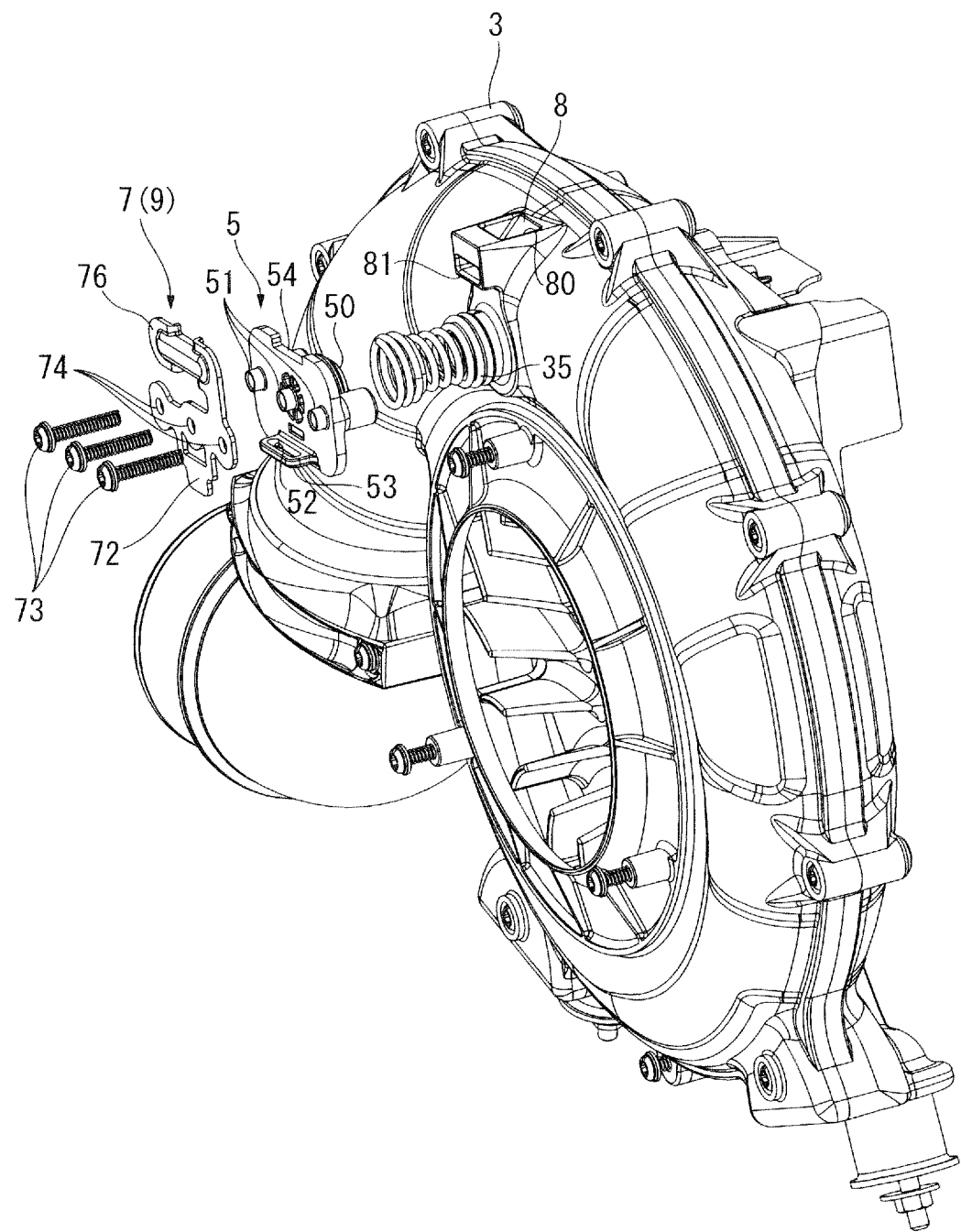
FIG. 8 is an illustration for explaining a plate according to a second exemplary embodiment of the invention.

FIG. 8 is an illustration for explaining the plate 7 according to the second exemplary embodiment. In the second exemplary embodiment, the same members and functional portions as those of the first exemplary embodiment will be denoted by the same reference numerals, and the description thereof will be omitted or simplified.

As shown in FIG. 8, in the second exemplary embodiment, the engaging section 76 is provided on an upper portion of the plate 7 and the folded-back section 60 of the stopper 6 is directly engaged with the engaging section 76 unlike the first exemplary embodiment. Other arrangements of the second exemplary embodiment are the same as those of the first exemplary embodiment.

In the second exemplary embodiment, the same advantages as the first exemplary embodiment can be attained. Further, since the attachment pin 75 is not required, the number of parts can be further reduced. Incidentally, only the plate 7 defines the attachment 9 in this exemplary embodiment.

Modification of Exemplary Embodiments

Though the invention has been described above with a specific embodiment(s) being particularly illustrated and mainly described, the invention is not limited to the above-described embodiment(s). Those skilled in the art may make various modifications and changes to the above-described embodiments without departing from a scope of a technical idea and an object of the invention.

Though the coil spring 35 defines the vibration-proofing section supporting the centrifugal blower 3 in the exemplary embodiments, the vibration-proofing section may be provided by the same member as the rubber mount 33 used in the first exemplary embodiment.

It is not required that the engaging section 63 is provided by the folded-back sections 62A and 62B opposing to each other as in the exemplary embodiments. The engaging section 63 may be provided by seaming three or more folded-back sections as long as the ends for providing the folded-back sections are disposed on the inner side of the engaging section 63.

The shape of the attachment pin 75 attached to the folded-back section 60 is not limited to the shape thereof as described in the first exemplary embodiment. The attachment pin 75 may be G-shaped, S-shaped or the like as long as the attachment pin 75 can be easily attached to the folded-back section 60 and not easily dropped out.

Though the protruding plate-side engaging section 72 is inserted into the slit 52 provided on the holder-side engaging section 53 in the exemplary embodiments, shapes of the plate-side engaging section 72 and the holder-side engaging section 53 are not limited to the shapes as described in the exemplary embodiments as long as the plate-side engaging section and the holder-side engaging section can be engaged with each other.

Also, it is not required that the engaging hole 8 is provided on the centrifugal blower 3. An engaging hole may be provided on the back support 21 of the frame 2 and the engaging section 63 of the stopper 6 may be engaged with the engaging hole. Further, engaging holes may be provided on both of the centrifugal blower 3 and the back support 21 while the engaging sections 63 are provided on both ends of the stopper 6, and the engaging sections 63 may be respectively engaged with the engaging holes. At this time, if a notch portion is provided to connect the insert opening and the lead-out opening on one of the engaging holes provided on the centrifugal blower 3 and the back support 21, the engaging section 63 can be inserted into the engaging hole from the notch portion. Accordingly, both of the engaging sections can be engaged with the engaging holes. Thus, the number of parts can be further reduced and assembly efficiency can be further improved because the attachment pin 75 and the plate 7 are not necessary.

It should be noted that, although the best structure, method and the like for carrying out the invention have been described in the above description, the invention is not limited to the above description. In other words, while the invention has been particularly illustrated and described with reference to the specific embodiment, those skilled in the art can modify the above-described shapes, quantities and other details without departing from the spirit and the scope of the invention.

Thus, a shape, quantity and the like described above merely serve as exemplifying the invention for facilitating an understanding of the invention, and do not serve as any limitations on the invention, so that what is described by a name of a component for which the description of the shape, quantity and the like are partially or totally omitted is also included in the invention.

The invention claimed is:

1. An engine blower, comprising:
    a centrifugal blower including a volute case in which a fan is accommodated;
    an engine attached to the centrifugal blower for driving the fan;
    a frame for supporting the centrifugal blower;
    a flexible vibration-proofing section which is interposed between the centrifugal blower and the frame; and
    a belt-shaped stopper which connects the centrifugal blower and the frame,
    wherein the centrifugal blower is supported by a back support of the frame via the flexible vibration-proofing section, and is also connected to the back support via the belt-shaped stopper,
    wherein an engaging hole is provided on at least one of the centrifugal blower and the back support, and
    wherein a thick engaging section to be engaged with the engaging hole is provided on at least one end of the stopper.

2. The engine blower according to claim 1, wherein the stopper comprises one consecutive belt member having both ends being folded inwardly to form folded-back sections, and the engaging section is provided by seaming the folded-back sections.

* * * * *